Patented Jan. 17, 1933

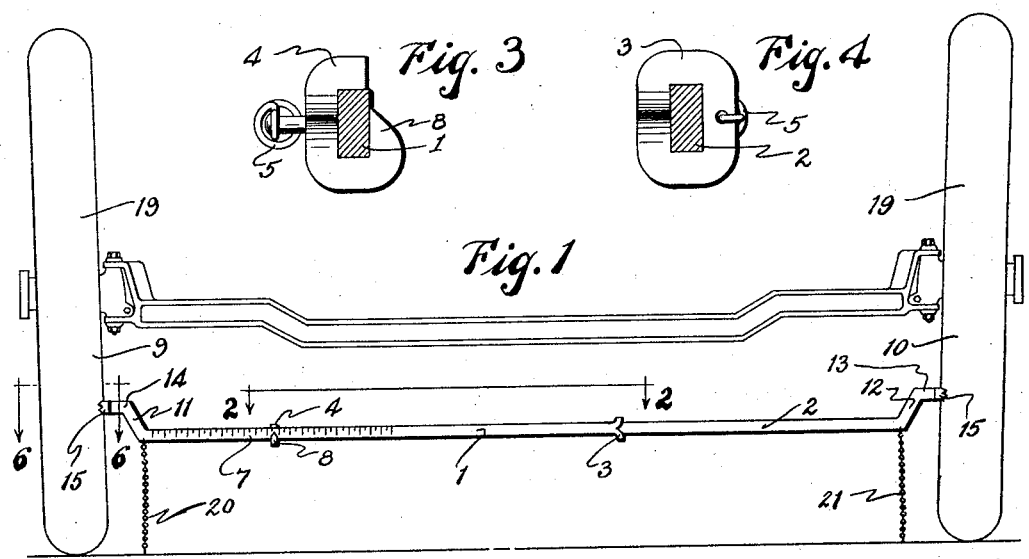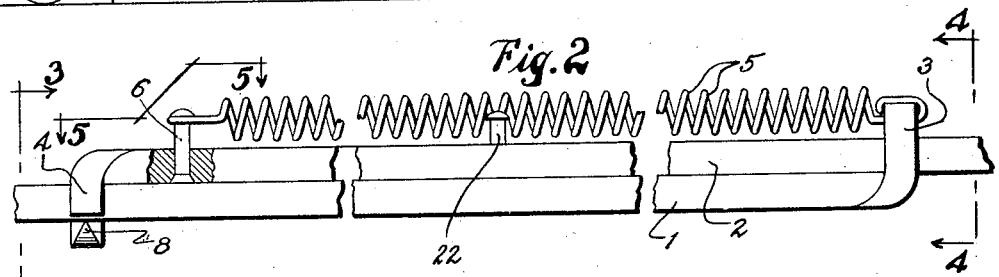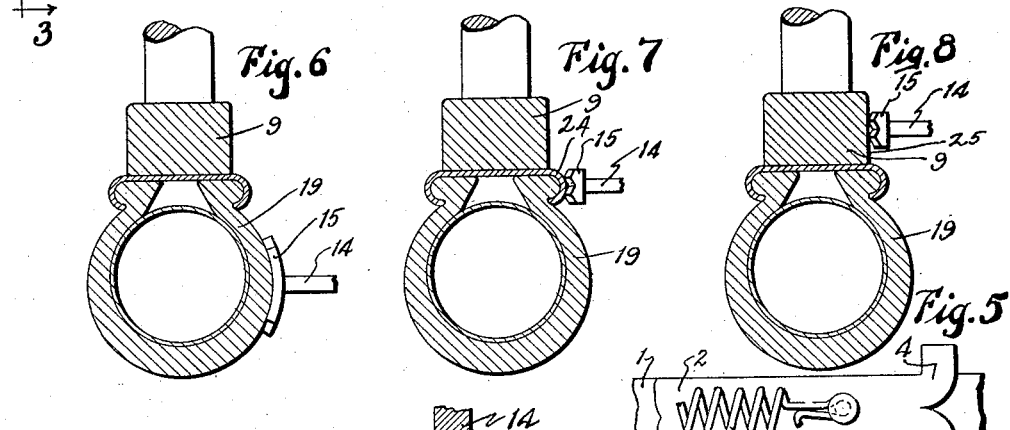

1,894,370

UNITED STATES PATENT OFFICE

FRED M. ERICKSON, OF PASADENA, CALIFORNIA

WHEEL ALIGNING GAUGE

Application filed June 20, 1928. Serial No. 286,778.

This invention relates to and has for an object the provision of an improved type of wheel aligning device for the front wheels of motor vehicles, whereby the alignment and camber of the wheels may be checked and corrected, and includes a suitable gauge for measuring the distances between the wheels, together with an improved means for applying the aligning means to the wheels.

Other objects will appear as the description progresses.

In the accompanying drawings I have shown a preferred form of device, subject to modification within the scope of the appended claims without departing from the spirit of my invention. In said drawings.

Fig. 1 is a front elevation of a pair of front wheels with my aligning device operatively positioned thereon.

Fig. 2 is an enlarged detail plan view of the gauge, partly broken away.

Fig. 3 is an end view of the same as seen on line 3—3 of Fig. 2.

Fig. 4 is an end view thereof as seen on line 4—4 of Fig. 2.

Fig. 5 is a fragmentary view of the gauge on line 5—5 of Fig. 2.

Figs. 6, 7 and 8 are corresponding sectional views of one of the wheels showing the gauge applied thereto in several different ways and for different purposes.

Fig. 9 is a face view of a gauge attaching member pivotally supported on the opposite ends of the gauge for application to the vehicle wheels.

Fig. 10 is a section of the same on line 10—10 of Fig. 9.

The gauge includes a pair of main members in the form of elongated bars 1 and 2 of rectangular cross section and slidable one upon the other. To this end bar 1 has its inner end bent to form a hook 3 which may wholly or partially encompass the other bar 2. Similarly bar 2 has a similar hook 4 at its inner end engaging the bar 1. Thus the two bars may slide one upon the other.

The inner portions of bars 1 and 2 are longitudinally connected by means of a tension spring 5 having its ends suitably attached to portions of the two bars, as by means of a projecting pin 6 on one of the bars (2) and to the hook 3 of the bar 1, or otherwise. Spring 5 thus serves to extend the bars longitudinally by drawing the inner ends thereof together or in the direction of each other.

A side of one of the bars (1) is provided with a scale of dimensions in feet and inches preferably as at 7 and the hook 4 of bar 2 may have an indicator 8 formed thereon, whereby when the bars are extended, as shown in Fig. 1, the distance between a pair of wheels 9 and 10 of a vehicle may be indicated on the scale 7.

The outer portions of the bars 1 and 2 are bent upwardly on diagonal lines as at 11 and 12, respectively, and thence horizontally at 13 and 14, and the portions 13 and 14 carry swiveled attaching members. Said attaching members are of arcuate form, as shown in Figs. 9 and 10, and have teeth 16, 16 and notches 17 formed on their opposite ends. Members 15 are preferably permanently attached to the portions 13 and 14, as shown in Fig. 10, so that said members will readily turn on their pivots 18. The curve of members 15 conforms, as indicated in Fig. 6, to the periphery of a tire 19 on one of the wheels, as at 9.

One of the bars may have a projecting pin 22 (see Fig. 2) which when engaged with the hook as at 3 of the opposite bar 1 will limit the extension of the two bars outwardly beyond an unnecessary extent. Chains 20 and 21 are suspended from the bars 1 and 2 adjacent the diagonal portions 11 and 12, respectively, and serve to correctly position the gauge on the wheels 9 and 10.

Thus, with the gauge applied to the wheels as shown in Figs. 1 and 6, the bars 1 and 2 are contracted inwardly so that the attaching members 15, 15 will engage the curved outer surfaces of the tires 19, 19 on wheels 9 and 10. Obviously the gauge is truly horizontal when the lower ends of the chains 20 and 21 touch the ground or other supporting surface of the vehicle.

In testing the wheels, the offset in the gauge between the diagonal portions 11 and 12 permits the movement of the gauge bodily beneath the crank case of the vehicle motor.

If the alignment of the wheels 9 and 10 is correct when the wheels are turned from the position shown in Fig. 1 to a corresponding position with the gauge behind the wheels the lower ends of the chains 20 and 21 will just clear the ground. If such is not the case then the wheels are out of alignment and the toe-in should be changed correspondingly.

The scale on the gauge provides means for accurately measuring the distance between the wheels at different positions so that any existing inaccuracy of alignment may be corrected visibly and readily.

As shown in Fig. 7, the members 14 may be applied to the wheel rims 24 in positions at right angles to the positions shown in Fig. 6 so that the notches 17 between the teeth 16 will engage the bead of the rim and hold the gauge in position on the wheels; or, as shown in Fig. 8, the members 15 may be applied to the flat surfaces of the felloes 25 of the wheels. In either case the operation of the gauge is the same.

In operation, the gauge is positioned between the wheels 9 and 10 at an elevation which will barely permit the chains 20 and 21 to clear the floor, after which a check is made to determine the alignment of one of the front wheels with the corresponding rear wheel, and a reading of the scale is taken. Without removing the gauge the vehicle is rolled forward until the chains 20 and 21 barely clear the floor and the scale is again read. The difference between the first and second readings will represent the extent of the "toe-in" or "toe-out" of the wheels as the case may be. The wheels are then adjusted until the two readings of the scale correspond, at which time it will be apparent that a true alignment of the wheels is indicated.

The tension of spring 5 at all times serves to hold the attaching members in gripping engagement with the wheels 9 and 10.

I claim:

1. A wheel alining gauge for automobiles comprising a pair of bars slidable one on the other, attaching members swivelling carried on the outer ends of said bars respectively and arcuately formed and provided with notches at their ends for engagement with the tires or rims of a pair of opposed vehicle wheels, and means for tensioning said bars so as to support the same on the opposed wheels for use.

2. A wheel aligning gauge for automobiles comprising a pair of bars slidable one on the other, the inner end of each of said bars being bifurcated and bent around the adjacent bar so as to provide guides for holding the bars in alignment, a tension spring longitudinally of and connecting the inner ends of said bars, and attaching members swivelly held on the outer ends of said bars, said members being of arcuate cross section and provided with toothed ends at uniform distances from their axes for engagement with the tires or rims of a pair of opposed vehicle wheels, whereby the gauge may be supported on the wheels in operative position.

3. A wheel aligning gauge for automobiles comprising a pair of bars slidable one on the other, the inner end of each of said bars being bifurcated and bent around the adjacent bar so as to provide guides for holding the bars in alignment, a tension spring longitudinally of and connecting the inner ends of said bars, attaching members swivelly held on the outer ends of said bars, said members being of arcuate cross section and provided with toothed ends at uniform distances from their axes and means carried by said bars and depending therefrom for positioning said attaching members on the wheels at uniform distances from a supporting surface.

FRED M. ERICKSON.